US011998066B2

(12) United States Patent
Yamagiwa et al.

(10) Patent No.: US 11,998,066 B2
(45) Date of Patent: Jun. 4, 2024

(54) KIGURUMI STAGING SUPPORT APPARATUS, KIGURUMI STAGING SUPPORT SYSTEM, AND KIGURUMI STAGING SUPPORT METHOD (71) Applicant: The Pokemon Company, Tokyo (JP)

(72) Inventors: Junichi Yamagiwa, Tokyo (JP); Masami Ishikawa, Tokyo (JP); Kana Takizawa, Tokyo (JP); Miki Sakurai, Tokyo (JP); Masafumi Nakamura, Tokyo (JP)

(73) Assignee: THE POKEMON COMPANY, Tokyo (JP)

( * ) Notice: Subject to any disclaimer, the term of this patent is extended or adjusted under 35 U.S.C. 154(b) by 396 days.

(21) Appl. No.: 17/346,297

(22) Filed: Jun. 14, 2021

(65) Prior Publication Data
US 2021/0329982 A1 Oct. 28, 2021

Related U.S. Application Data (63) Continuation of application No. PCT/JP2019/048689, filed on Dec. 12, 2019.

(30) Foreign Application Priority Data

Dec. 14, 2018 (JP) ................. 2018-234408

(51) Int. Cl.
A41D 1/00 (2018.01)
A63J 7/00 (2006.01)
(Continued)

(52) U.S. Cl.
CPC .............. *A41D 1/002* (2013.01); *A63J 7/005* (2013.01); *G06V 40/16* (2022.01); *G10L 25/48* (2013.01); *G06V 40/178* (2022.01)

(58) Field of Classification Search
CPC ......... A41D 1/002; A63J 7/005; G06V 40/16; G06V 40/178; G10L 25/48
See application file for complete search history.

(56) References Cited

U.S. PATENT DOCUMENTS 6,272,877 B1 * 8/2001 Halloran ............ A41D 13/0053
62/77
7,791,608 B2 * 9/2010 Henson .................. G06T 13/40
345/473
(Continued)

FOREIGN PATENT DOCUMENTS

JP 2009-213874 A 9/2009
WO 2017/104654 A1 6/2017
(Continued)

OTHER PUBLICATIONS

Office Action dated Mar. 15, 2023 in Japanese Patent Application No. 2020-007150, 7 pages.
(Continued)

Primary Examiner — Kenny Nguyen
(74) Attorney, Agent, or Firm — XSENSUS LLP (57) ABSTRACT A kigurumi staging support apparatus to be worn by a performer of kigurumi. The kigurumi staging support apparatus acquires environmental information of surroundings of the kigurumi, stores staging information of the kigurumi, and outputs, based on the staging information, staging of the kigurumi in accordance with the environmental information.

16 Claims, 6 Drawing Sheets (51) Int. Cl.
*G06V 40/16* (2022.01)
*G10L 25/48* (2013.01)

(56) References Cited

U.S. PATENT DOCUMENTS

| | | | | |
|---|---|---|---|---|
| 10,338,686 | B2 * | 7/2019 | Robertson | G06V 40/28 |
| 10,421,023 | B2 * | 9/2019 | Ikemoto | H04L 67/535 |
| 10,485,477 | B1 * | 11/2019 | Lapetina | A61B 5/7475 |
| 10,573,146 | B1 * | 2/2020 | Jordan, II | G08B 21/0446 |
| 11,707,198 | B2 * | 7/2023 | Eggers | A61B 8/488 |
| | | | | 600/301 |
| 2002/0193047 | A1 * | 12/2002 | Weston | A63H 3/00 |
| | | | | 446/484 |
| 2006/0184800 | A1 * | 8/2006 | Rosenberg | G06F 21/32 |
| | | | | 713/186 |
| 2009/0203286 | A1 * | 8/2009 | Murayama | A63H 33/00 |
| | | | | 446/28 |
| 2015/0223576 | A1 * | 8/2015 | Vora | A44C 15/0015 |
| | | | | 362/104 |
| 2016/0331320 | A1 * | 11/2016 | Durbhaka | A61B 5/0205 |
| 2016/0335871 | A1 * | 11/2016 | Kim | G08B 21/0288 |
| 2017/0285757 | A1 * | 10/2017 | Robertson | G06F 3/014 |
| 2018/0321700 | A1 * | 11/2018 | Kwak | G05D 23/1919 |
| 2019/0049906 | A1 * | 2/2019 | Bennett | A41D 1/002 |
| 2022/0266068 | A1 * | 8/2022 | Connor | A62B 7/10 |

FOREIGN PATENT DOCUMENTS

| | | |
|---|---|---|
| WO | 2018/087968 A1 | 5/2018 |
| WO | 2018/102313 A2 | 6/2018 |
| WO | 2018/199115 A1 | 11/2018 |

OTHER PUBLICATIONS

International Search Report and Written Opinion dated Mar. 17, 2020, received for PCT Application PCT/JP2019/048689, Filed on Dec. 12, 2019, 9 pages including English Translation.

Office Action dated Oct. 19, 2022, in corresponding Japanese patent Application No. 2020-007150, 10 pages.

* cited by examiner

KIGURUMI STAGING SUPPORT APPARATUS, KIGURUMI STAGING SUPPORT SYSTEM, AND KIGURUMI STAGING SUPPORT METHOD

CROSS-REFERENCE TO RELATED APPLICATIONS

The present application is a bypass continuation of PCT Application No. PCT/JP2019/048689, filed Dec. 12, 2019, which claims priority to JP2018-234408, filed Dec. 14, 2018, the entire contents of each are incorporated herein by its reference.

TECHNICAL FIELD

The present disclosure relates to a kigurumi staging support apparatus, a kigurumi stag ng support sys tem, and a kigurumi staging support method.

BACKGROUND

Kigurumi is a collective term for human-sized stuffed toys which cover an entire body of a person and which are made using special clothing, materials, and the like. Owing to staging in which a person (a performer) enters inside a kigurumi and changes shape by covering his/her entire body with special clothing representing an imaginary being (character) such as an anthropomorphized animal, monster, or the like, kigurumi is widely used in various events, at amusement parks, on television programs, and the like. For example, PTL 1 discloses kigurumi simulating a mascot character.

CITATION LIST

Patent Literature

[PTL 1] Japanese Patent No. 6434184

SUMMARY

Technical Problem

A structure of kigurumi that covers an entire body of a performer makes it difficult to hear surrounding sounds and also limits the performer's field of view. Therefore, there is a problem in that it is difficult for the performer to comprehend his/her surrounding situation and it is a challenge to act in response to a reaction of a spectator or to act by coordinating timings with other kigurumi.

In consideration thereof, the present disclosure has been made in order to solve the problem described above and an object thereof is to provide a kigurumi staging support apparatus that outputs staging of kigurumi in accordance with a surrounding situation.

Solution to Problem

In order to achieve the object described above, a kigurumi staging support apparatus according to the present disclosure is an apparatus to be worn by a performer of kigurumi, the kigurumi staging support apparatus including: an interface configured to acquire environmental information of surroundings of the kigurumi; a memory configured to store staging information of the kigurumi; and processing circuitry configured to output, based on the staging information, staging of the kigurumi in accordance with the environmental information.

In order to achieve the object described above, a kigurumi staging support system according to the present disclosure includes: an information terminal that transmits staging information of the kigurumi; and a kigurumi staging support apparatus to be worn by a performer of the kigurumi, wherein the kigurumi staging; support apparatus includes an interface configured to acquire environmental information of surroundings of the kigurumi; a memory configured to store staging information of the kigurumi; and processing circuitry configured to output, based on the staging information, staging of the kigurumi in accordance with the environmental information.

Furthermore, in order to achieve the object described above, a kigurumi staging support method according to the present disclosure is a staging support method with respect to a performer to wear a kigurumi staging support apparatus, the method including: acquiring, by an interface of the kigurumi staging support apparatus, environmental information of surroundings of the kigurumi; storing, by a memory of the kigurumi staging support apparatus, staging information of the kigurumi; and causing the kigurumi staging support apparatus to output a staging characteristic based on the staging information and the environmental information.

Advantageous Effects

According to the present disclosure, staging of kigurumi in accordance with a surrounding situation can be output.

DESCRIPTION OF EMBODIMENTS

Hereinafter, an embodiment of the present disclosure will be described with reference to the drawings. In all of the diagrams for explaining the embodiment, common components will be denoted by same reference signs and repetitive descriptions will be omitted. It is to be understood that the following embodiment does not unduly restrict the contents of the present disclosure as set forth in the scope of claims. In addition, not all components described in the embodiment are essential components of the present disclosure. It as also to be understood that the respective drawings are schematic views and are not necessarily strict illustrations.

Embodiment

Figure 1:
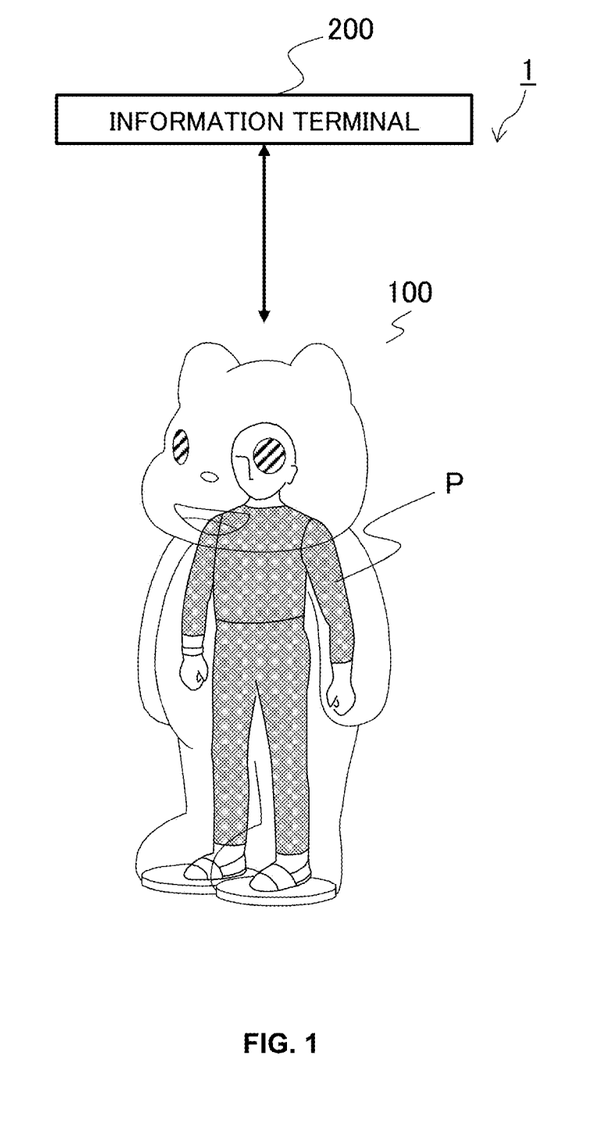
FIG. 1 is a configuration diagram of a kigurumi staging support system 1.

FIG. 1 is a configuration diagram of a kigurumi staging support system 1. A configuration of the kigurumi staging support system 1 according to the present embodiment will be described with reference to FIG. 1.

The kigurumi staging support system 1 includes a staging support apparatus 100 and an information terminal 200. The staging support apparatus 100 and the information terminal 200 are connected so as to be capable of communication.

The staging support apparatus 100 is an apparatus to be worn by a performer P of kigurumi and is a kigurumi staging support apparatus that outputs staging of the kigurumi in accordance with a surrounding situation of the kigurumi. A structure of the kigurumi (which corresponds to outerwear 10 to be described later) that covers an entire body of the performer P makes it difficult to hear surrounding sounds and also limits a field of view. Therefore, it is difficult for the performer P to comprehend his/her surrounding situation and it is a challenge for the performer P to act in response to a reaction of a spectator or to act by coordinating timings with other kigurumi. In consideration thereof, the staging support apparatus 100 according to the present embodiment analyzes a surrounding situation of the kigurumi and outputs staging of the kigurumi in accordance with the situation. Accordingly, a burden with respect to staging of the kigurumi to be performed by the performer P of the kigurumi can be reduced and seemingly-improvised staging can be performed.

For example, in response to a shout by a spectator with respect to the kigurumi, the staging support apparatus 100 changes an external appearance of the kigurumi by causing the entire kigurumi or a part thereof to emit light, moves a component (a part) of the kigurumi such as an ear or the tail of the kigurumi, or outputs a cry of the animal or the like being simulated by the kigurumi. It is difficult for the performer P inside the kigurumi to hear a shout by a spectator or the like and to immediately respond to the shout. However, by performing staging such as those described above using the staging support apparatus 100, the spectator can gain a sense of affinity toward the kigurumi that reacts to the spectator's own action and can enjoy a greater sense of togetherness.

The information terminal 200 is used by a provider of the staging support apparatus 100, a director of the kigurumi, or the like (hereinafter, referred to as a "director or the like") in order to configure staging information of the kigurumi. Staging information refers to information which indicates staging that is performed with respect to the kigurumi in accordance with a surrounding situation and which associates a surrounding situation and the staging to be output with each other such as performing staging involving wagging the tail or the like of the kigurumi, uttering a voice, or the like in response to a shout, a hand gesture, or the like by the spectator.

Figure 2:
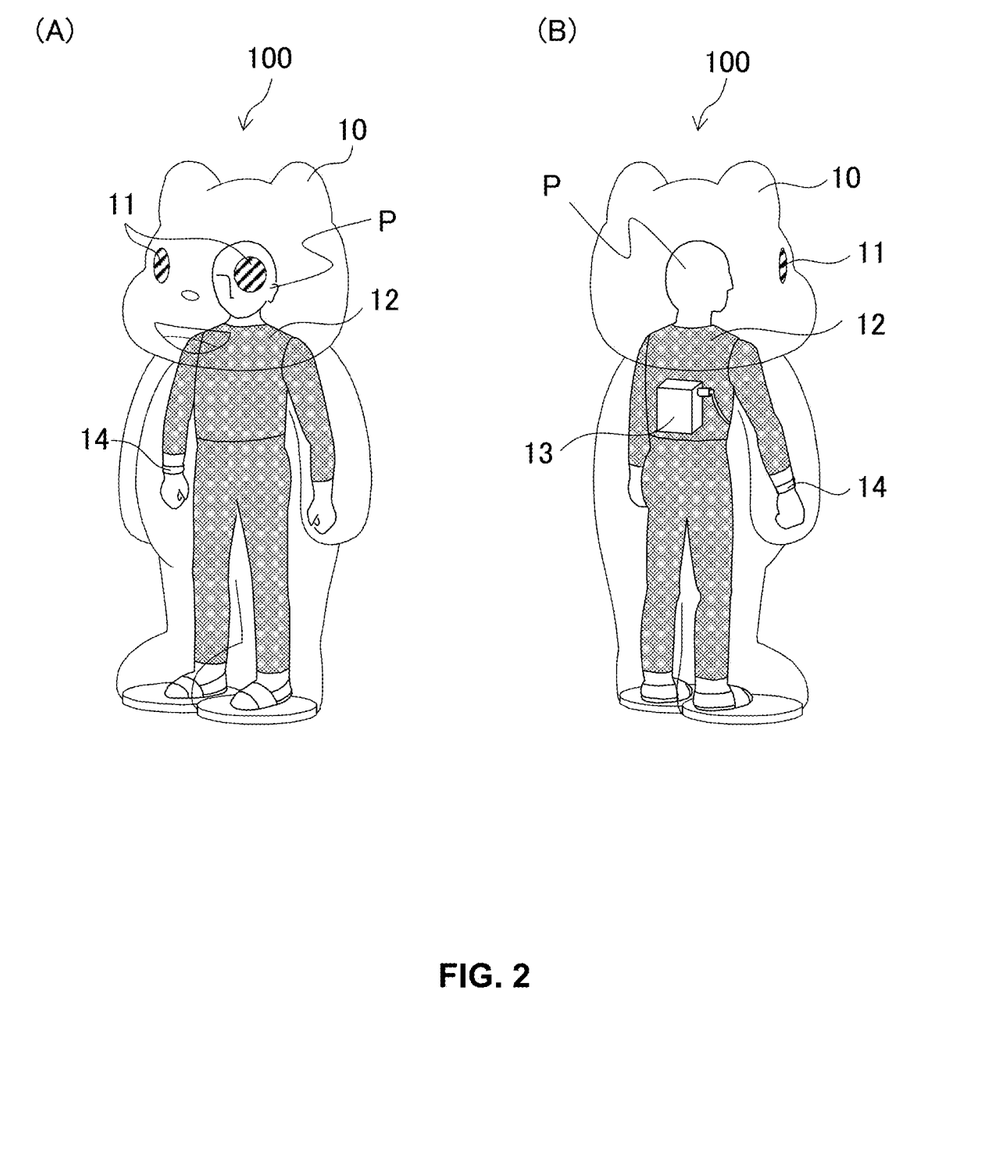
FIG. 2 is a schematic diagram representing a staging support apparatus 100.

FIG. 2 is a schematic diagram representing the staging support apparatus 100. FIG. 2(A) is diagram of the staging support apparatus 100 as viewed from approximately the front and FIG. 2(B) is a diagram of the staging support apparatus 100 as viewed from approximately the rear.

The staging support apparatus 100 has the outerwear 10 that covers the body of the performer P. The outerwear 10 is kigurumi that covers the performer P and a space to be entered by the performer P is formed therein. While the outerwear 10 covers the entire body of the performer P in the example shown in FIG. 2, the outerwear 10 need only be configured to at least cover the head of the performer P. An external appearance of the outerwear 10 represents a character such as an animal or a monster and is manufactured using, for example, a boa fabric or a nylon fabric. It should be noted that, in the present embodiment, the outerwear 10 may be described as "kigurumi".

An observation hole 11 is formed in the outerwear 10 and the performer P inside the outerwear 10 can observe surroundings via the observation hole 11. The observation hole 11 is formed as, for example, an eye portion or a mouth portion of the character in order to prevent the spectator from being aware of the presence of the performer P inside. Alternatively, for example, a configuration may be adopted in which a video of the surroundings photographed by a camera arranged in a portion that is inconspicuous to the spectator such as an eye or the mouth is displayed on a spectacle-type terminal or the like being worn by the performer P.

In addition, the outerwear 10 is provided with a staging output mechanism (not illustrated) that outputs staging of the kigurumi. For example, a mechanism for moving a component such as an ear, the mouth, or the tail of the kigurumi, a mechanism for causing the entire kigurumi or a part thereof to emit light, a mechanism for outputting sound, or the like is provided. The staging output mechanism may be configured such that, for example, power is supplied from a battery 13 arranged in a dedicated pocket or the like of innerwear 12 to be worn by the performer P.

Furthermore, the outerwear 10 may be configured such that outside air is fed into the internal space by an air blower (not illustrated) to expand the kigurumi so as to maintain its shape. For example, the air blower may be arranged on an inner surface of the outerwear 10 or carried on the back by the performer P.

When the performer P makes various moves in such a state, the outerwear 10 moves in the same way. Although the outerwear 10 is provided with the observation hole 11, generally, a field of view of the performer P inside the kigurumi is narrow and it is difficult for the performer P to comprehend a surrounding situation. In addition, it is also difficult to hear surrounding sounds due to factors such as a material of the outerwear 10, the presence of an internal air blower, and the like. Therefore, it is difficult for the performer P who is unable to comprehend a surrounding situation to make a seemingly-improvised movement in response to a reaction by the spectator. In consideration thereof, the staging support apparatus 100 is configured to analyze a spectator's reaction based on a video obtained by photographing the surrounding situation of the kigurumi and perform staging of the kigurumi based on an analysis result. Accordingly, a burden of movement by the performer P can be reduced and, at the same time, the spectator can be instilled with a sense of affinity with respect to the kigurumi having reacted to the spectator's movement.

The battery 13 is a secondary battery or the like and supplies power with respect to a load portion such as the staging output mechanism included in the staging support apparatus 100. For example, the battery 13 is arranged in a dedicated pocket that is positioned in a back portion of the performer P.

While a wearable terminal 14 is, for example, a wrist watch-type or wristband-type information terminal in the present embodiment, alternatively, the wearable terminal 14 may be an earphone-type or a spectacle-type information terminal, an HMD (a head-mounted display), or the like. The wearable terminal 14 uses sensor functions to measure biometric information of the performer P or measure information related to humidity and temperature of the internal space of the kigurumi. In addition, the wearable terminal 14 may notify the performer P of information acquired by the sensor functions and a timing of staging configured by the director or the like through vibration, sound, display on a display, or the like. For example, the performer P may be notified of a timing to raise an arm of the kigurumi, a timing to start walking, or the like through vibration, sound, emission of light from a display, or the like.

The staging support apparatus 100 may be configured to output staging of the kigurumi based on biometric information of the performer P acquired by the wearable terminal 14. In other words, due to the structure of the kigurumi, the performer P is likely to feel a sense of burden caused by a weight of the outerwear 10 or a sense of fatigue caused by heat and humidity that build up inside the internal space. However, since staging of the kigurumi requires that the presence of the performer P inside the kigurumi remain unnoticed from the outside, it is difficult to judge a state of health of the performer P from the outside. In consideration thereof, in the present embodiment, staging of the kigurumi may be performed in accordance with a state inside the kigurumi such as a state of health of the performer P that is detected from internal humidity and temperature, biometric information of the performer P, and the like. For example, by automatically making a move or changing an external appearance as though staging of the kigurumi is being performed when the performer P is unwell, staging of the kigurumi in consideration of the state of health of the performer P can be performed.

Figure 3:
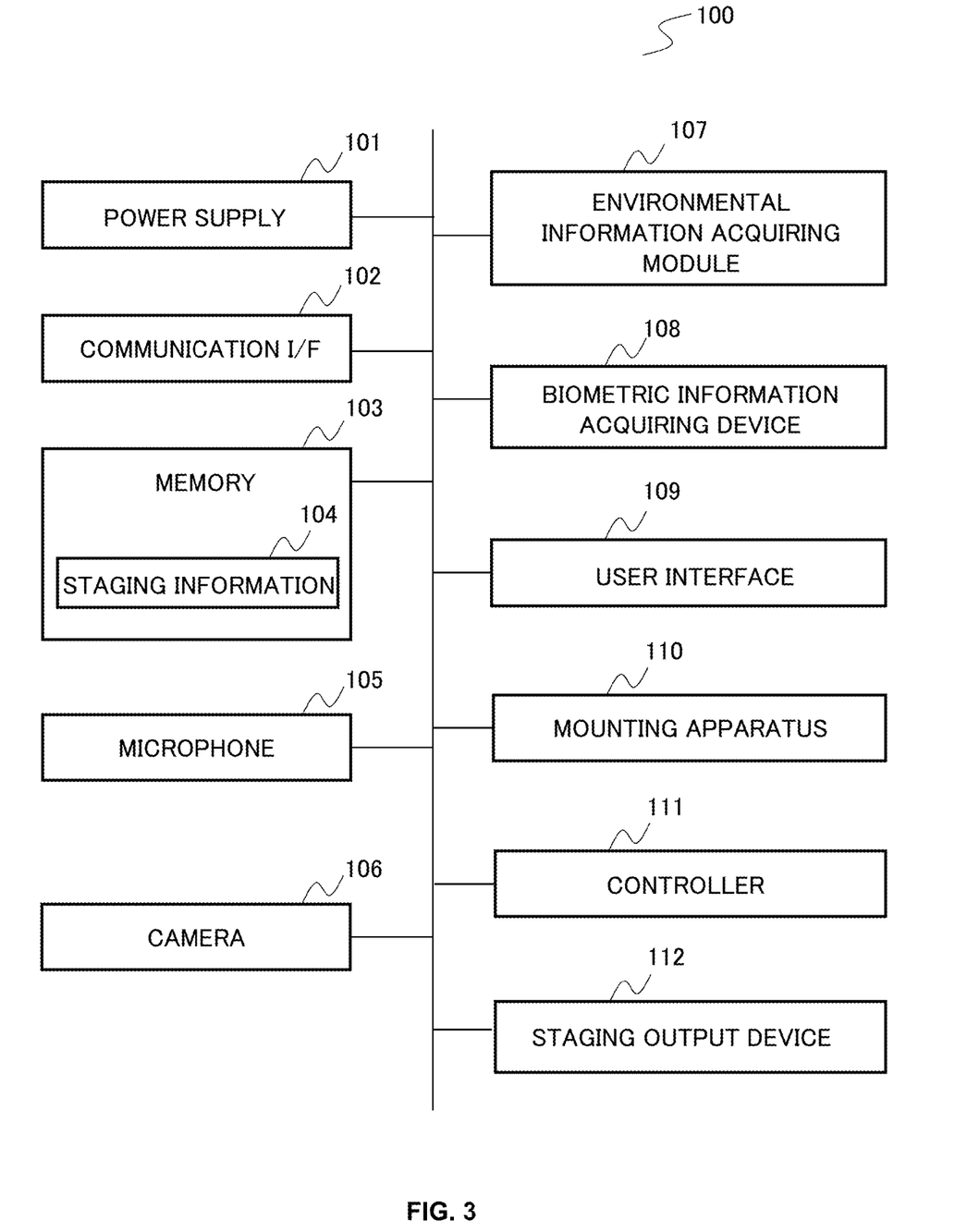
FIG. 3 is a functional block diagram showing a schematic configuration of the staging support apparatus 100.

FIG. 3 is a functional block diagram showing a schematic configuration of the staging support apparatus 100. A functional configuration of the staging support apparatus 100 will now be described with reference to FIG. 3.

The staging support apparatus 100 is an apparatus to be worn by the performer P of the kigurumi and includes a power supply 101, a communication interface 102, a memory 103, a microphone 105, a camera 106, an environmental information acquiring module 107, a biometric information acquiring device 108, a user interface 109, a mounting apparatus 110, a controller 111, and a staging output device 112.

The power supply 101 is, for example, a battery such as a secondary battery and supplies power to the respective units of the staging support apparatus 100.

The communication interface 102 is, for example, a communication module (a communication circuit) for performing wireless communication with the information terminal 200 and performs various controls for communication. The communication interface 102 receives staging information from the information terminal 200. A communication standard of the wireless communication is not particularly limited. For example, the IEEE 802.15.1 standard that is an international standard for short-range wireless communication represented by Bluetooth (registered trademark) is used for the wireless communication. Alternatively, the IEEE 802.11 standard that is an international standard for wireless communication represented by wireless LAN (Local Area Network) or Wi-Fi (registered trademark) may be used. In addition, the communication interface 102 may perform various controls for communication via the Internet, mobile communication networks, and the like.

The memory 103 is a storage apparatus for storing a program and various kinds of data that enable a computer to function. The memory 103 may include a temporary storage area or a storage. The memory 103 may include storage media of various types. The memory 103 may include a combination of a portable storage medium such as a memory card, an optical disc, or a magneto optical disk and a reading apparatus of the storage medium. The memory 103 stores staging information 104 having been received by the communication interface 102 from the information terminal 200.

The microphone 105 is in the kigurumi and which picks up surrounding sounds of the kigurumi. In order to enable surrounding sounds to be picked up in a favorable manner, the microphone is preferably arranged on an outer surface (an external appearance surface) of the kigurumi. In addition, the microphone is preferably arranged so that the presence of the microphone is inconspicuous to the spectator.

Alternatively, the microphone 105 may be a is arranged near the kigurumi or a microphone which is owned by one of another kigurumi near the kigurumi, a person attending to the kigurumi, and a spectator and which is configured to pick up surrounding sounds of the kigurumi.

The camera 106 is, for example, arranged on an outer surface an external appearance surface) of the kigurumi and which photographs the surroundings of the kigurumi. The camera is preferably arranged on a front surface, a side surface, or a rear surface of the kigurumi so that the presence of the camera is inconspicuous to the spectator. Arranging the camera on the rear surface and performing staging of kigurumi in accordance with a movement of a spectator behind the kigurumi enables the spectator to be pleasantly surprised and instills a sense of affinity and interest toward the kigurumi.

The environmental information acquiring module 107 acquires environmental information on the surroundings of the kigurumi. The environmental information acquiring module 107 acquires a sound picked up by the microphone 105 or an image photographed by the camera 106 as environmental information. In this case, an image includes concepts of a still image and a moving image. In addition, the environmental information acquiring module 107 may acquire, via the communication interface 102, an image photographed by an external photographing apparatus. The external photographing apparatus may be, for example, a camera of a smartphone owned by the spectator, a camera mounted to a small flying object that is controlled via short-range radio, or a camera installed near the kigurumi. Furthermore, for example, the environmental information acquiring module 107 may detect a touch or a hug with respect to the kigurumi by the spectator using a pressure sensor or the like arranged on an outer surface of the kigurumi.

The biometric information acquiring device 108 acquires biometric information on the performer of the kigurumi. The biometric information acquiring device 108 is, for example, a wearable terminal (an information processing terminal) having a sensor function and acquires biometric information (for example, a heart rate, a pulse, or a body temperature) of the performer P. In addition, an amount of movement or motion data of the performer P may be acquired as biometric information. Alternatively, the biometric information or the like may be calculated by a general function provided in the wearable terminal. In addition, for example, the biometric information acquiring module 108 may acquire humidity, temperature, or the like inside the kigurumi from a sensor arrangement on an inner surface of the kigurumi, estimate a state of health of the performer P based on a change in the humidity or the temperature, a length of time the performer P has been inside the kigurumi, and the like and acquire the estimated state of health as the biometric information.

The user interface 109 is, for example, a microphone, a speaker, a vibrator, or a touch panel which accepts an input from the performer P and which provides the performer P with various kinds of information. The user interface 109 may send the input accepted from the performer P to the communication interface 102 and the communication interface 102 may transmit the input to the external information terminal 200. In addition, the input accepted by the user interface 109 may be sent to the controller 111 as staging information. Furthermore, the user interface 109 may notify staging formation, a message input by the director or the like, and the like from the information terminal 200 having been received via the communication interface 102 using sound output from the speaker or vibration generated by the vibrator.

The mounting apparatus 110 is constituted by outerwear (refer to FIG. 2) that is configured to at least cover the head of the performer P. An external appearance of the outerwear is formed so as to represent a character such as an animal or a monster. In addition, a space to be entered by the performer P is formed inside the outerwear.

The controller 111 includes a processor that controls and manages an entirety of the staging support apparatus 100 including the respective functional blocks of the staging support apparatus 100. The controller Ill includes a processor such as a CPU (Central Processing Unit) that executes a program defining control procedures. Such a program is stored in, for example, a storage medium such as the memory 103.

The staging output device 112 outputs, based on staging information 104 stored by the memory 103, staging of the kigurumi in accordance with the environmental information acquired by the environmental information acquiring module 107. The staging output device 112 analyzes an age and/or a gender of the spectator based on environmental information. Staging of the kigurumi can be varied depending on whether the spectator is a male child or a female child. In addition, by also varying staging depending on whether the spectator is an adult person, an elderly, or a male or female, seemingly-improvised staging can be performed.

In addition, the staging output device 112 may analyze a facial expression or a movement of the spectator. Staging may be performed so that the kigurumi reacts joyfully or reacts sorrowfully depending on the facial expression or the movement of the spectator. It should be noted that the analysis of environmental information performed by the staging output device 112 can be performed by image recognition or voice recognition which are known techniques.

The staging information 104 may be regularly updated by being received by the communication interface 102 from the information terminal 200 or may be stored in the memory 103 in advance. The staging information 104 stores, in association with each other, a reaction of the spectator having been analyzed based on environmental information and staging of the kigurumi to be performed with respect to the reaction.

The staging output device 112 receives supply of power from the power supply 101 and converts the supplied power into a force or the like that drives components of the kigurumi. For example, the staging output device 112 performs staging that changes an external appearance of the kigurumi. Specifically, lighting such as an LED arranged over the entire kigurumi or a part thereof may be caused to emit light, a color of the emitted light may be changed, or lighting built into an eye or mouth portion may be caused to blink. A light-emitting portion may be changed, a color may be changed, an intensity of light may be changed, or a blinking interval may be changed depending on an age, gender, a facial expression, movement, or the like of the spectator. For example, a staging that causes the face of the kigurumi to turn red when hugged or touched by the spectator may be performed.

In addition, for example, the staging output device 112 performs staging that moves at least a part of the kigurumi. Specifically, a portion formed as a part of the outerwear such as an ear, the mouth, an eye, an eyebrow, a cheek, a mustache, or the tail of the kigurumi may be moved. A portion to be moved or how the portion is to be moved may be changed depending on an age, gender, a facial expression, a movement, or the like of the spectator.

Furthermore, for example, the staging output device 112 performs staging that outputs a sound from the kigurumi. Specifically, a call of an animal or a living organism or a tag line of a character being simulated by the kigurumi may be output. In addition, a sound of the kigurumi may be stored in the memory 103 in advance, and the staging output device 112 may synthesize the sound of the kigurumi based on a name or a nickname of the spectator having been recognized from an image or a sound of the surroundings and cause the kigurumi to utter the name or the like. For example, the name or the nickname may be recognized from a response by the spectator having been asked of his/her name, the voice of a parent calling a child, a nametag being worn by a child, or the like. A sound to be output or a tone of the sound may be changed depending on an age, gender, a facial expression, a movement, or the like of the spectator.

It is needless to say that the kigurumi performed by the staging output device 112 is not limited to the above and differs depending on a character being simulated by the kigurumi. Due to the staging of the kigurumi performed by the staging output device 112, seemingly-improvised staging in accordance with a surrounding situation of the kigurumi can be performed. Accordingly, the spectator can be given a pleasant surprise and be instilled with a sense of affinity, and interest toward staging of the kigurumi can be aroused.

In addition, the staging output device 112 may be configured to output staging of the kigurumi based on staging information when the biometric information acquired by the biometric information acquiring device 108 satisfies a predetermined condition. In other words, due to the structure of the kigurumi, the performer P is likely to feel a sense of burden caused by a weight of the outerwear 10 or a sense of fatigue caused by heat and humidity that build up inside the internal space. However, since staging of the kigurumi requires that the presence of the performer P inside the kigurumi remain unnoticed from the outside, it is difficult to judge a state of health of the performer P from the outside. In consideration thereof, the staging output device 112 may perform staging of the kigurumi based on staging information when the biometric information of the performer P satisfies a predetermined condition but perform staging that differs from the staging when the biometric information of the performer P does not satisfy the predetermined condition. For example, as the predetermined condition, the staging output device 112 determines whether or not the biometric information is within a normal numerical value range of the performer P during exercise. When the predetermined condition is not satisfied, it is assumed that physical conditions of the performer P are poor. In this case, the staging output device 112 notifies a person outside of the kigurumi of a change in a state of health of the performer P by outputting a move or changing an external appearance as though staging of the kigurumi is being performed. Accordingly, staging of the kigurumi in consideration of the state of health of the performer P can be performed. The staging in this case can be configured in advance by the director or the like.

Figure 4:
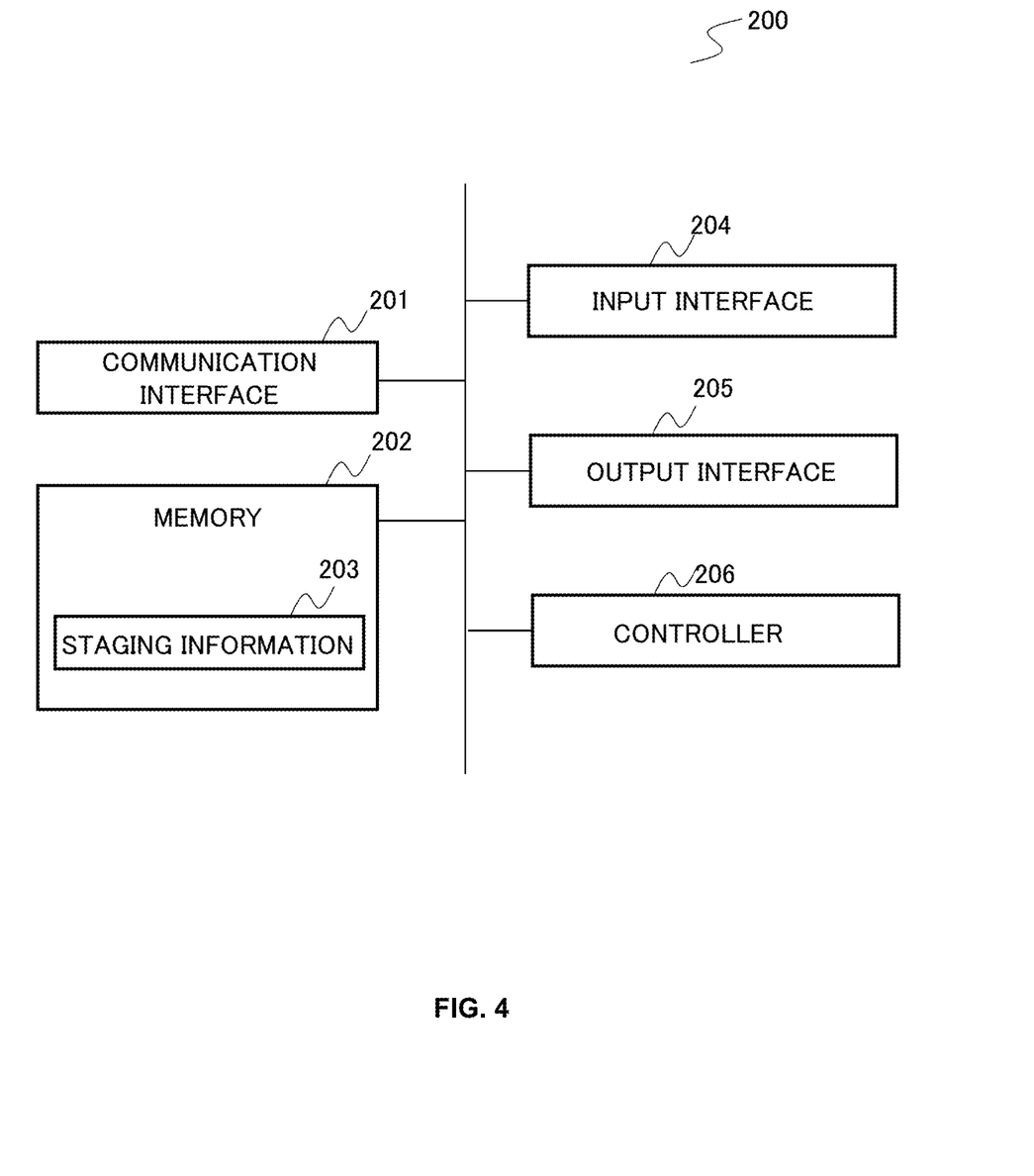
FIG. 4 is a functional block diagram showing as example of a functional configuration of an information terminal 200.

FIG. 4 is a functional block diagram showing an example of a functional configuration of the information terminal 200. Alternatively, the information terminal 200 according to the present embodiment may be configured by omitting a part of components shown in FIG. 4.

The information terminal 200 is an information processing apparatus that is used by the director or the like in order to configure staging information of the kigurumi. While the information terminal 200 is a mobile terminal such as a smartphone or a tablet terminal in the present embodiment, alternatively, the information terminal 200 may be a personal computer, a portable game machine, a stationary game machine, a wearable terminal such as a head mounted display, or a multifunctional device such as a multifunctional television receiver (a smart television) equipped with an information processing function. In other words, the information terminal 200 has various functions (for example, an input function, an output (display) function, an information processing function, a communication function, a sensor function, a call function, and a camera function) which are included in a general multifunctional device. The information terminal 200 may be realized by installing a predetermined function in an existing multifunctional device. In addition, the information terminal 200 may be a dedicated terminal having been manufactured in correspondence to the staging support apparatus 100.

The information terminal 200 includes a communication interface 201, a memory 202, an input interface 204, an output interface 205, and a controller 206.

The communication interface 201 is a communication module (a communication circuit) for performing wireless communication with the staging support apparatus 100 and performs various controls for communication. The communication interface 201 transmits staging information to the staging support apparatus 100. It should be noted that a communication standard of the wireless communication is not particularly limited and examples thereof include Bluetooth, infrared communication, and radio wave communication. In addition, the communication interface 201 may perform various controls for communication via the Internet, mobile communication networks, and the like.

The memory 202 is a storage apparatus for storing a program and various kinds of data that enable a computer to function. The memory 202 stores staging information 203 configured by the director or the like.

The input interface 204 is an interface for accepting an input from the director or the like and sends an accepted input to the controller 206. For example, the input interface 204 accepts staging information of the kigurumi from the director or the like as an input. For example, the input interface 204 is a touch panel, a button, or a controller. In addition, the input interface 204 may adopt a sound picked up by a microphone as an input. Furthermore, the input interface 204 may adopt sensing data having been sensed by a sensor function as an input. For example, a motion sensor is mounted to the kigurumi being worn by the director or the like as a performer, in which case motion data sensed with respect to staging of the kigurumi performed by the director or the like is accepted as an input. In addition, the input interface 204 may have a dedicated interface for inputting a control Parameter for controlling the staging output device 112 of the staging support apparatus 100.

The output interface 205 is, for example, a display apparatus such as a display, an audio output apparatus such as a speaker, or a vibratory apparatus such as a vibrator, and displays or outputs various kinds of images, audio, or vibrations generated by the information terminal 200 in accordance with an input with respect to the input interface 204. The output interface 205 may be an artificial intelligence-mounted speaker (a smart speaker).

The controller 206 executes various kinds of information processing to be executed in the information terminal 200. The controller 206 has a CPU (Central Processing Unit) and a memory. In the information terminal 200, the various kinds of information processing described above are executed by having the CPU use the memory to execute an information processing program stored in the memory 202. In the present embodiment, as the information processing described above, the controller 206 performs processing for causing the memory 202 to store staging information accepted by the input interface 204 and transmitting the staging information to the staging support apparatus 100 via the communication interface 201. In addition, the controller 206 may be configured to generate control information for controlling the staging output device 112 of the staging support apparatus 100 from staging information configured by the director or the like and transmit the control information to the staging support apparatus 100 via the communication interface 201.

Figure 5:
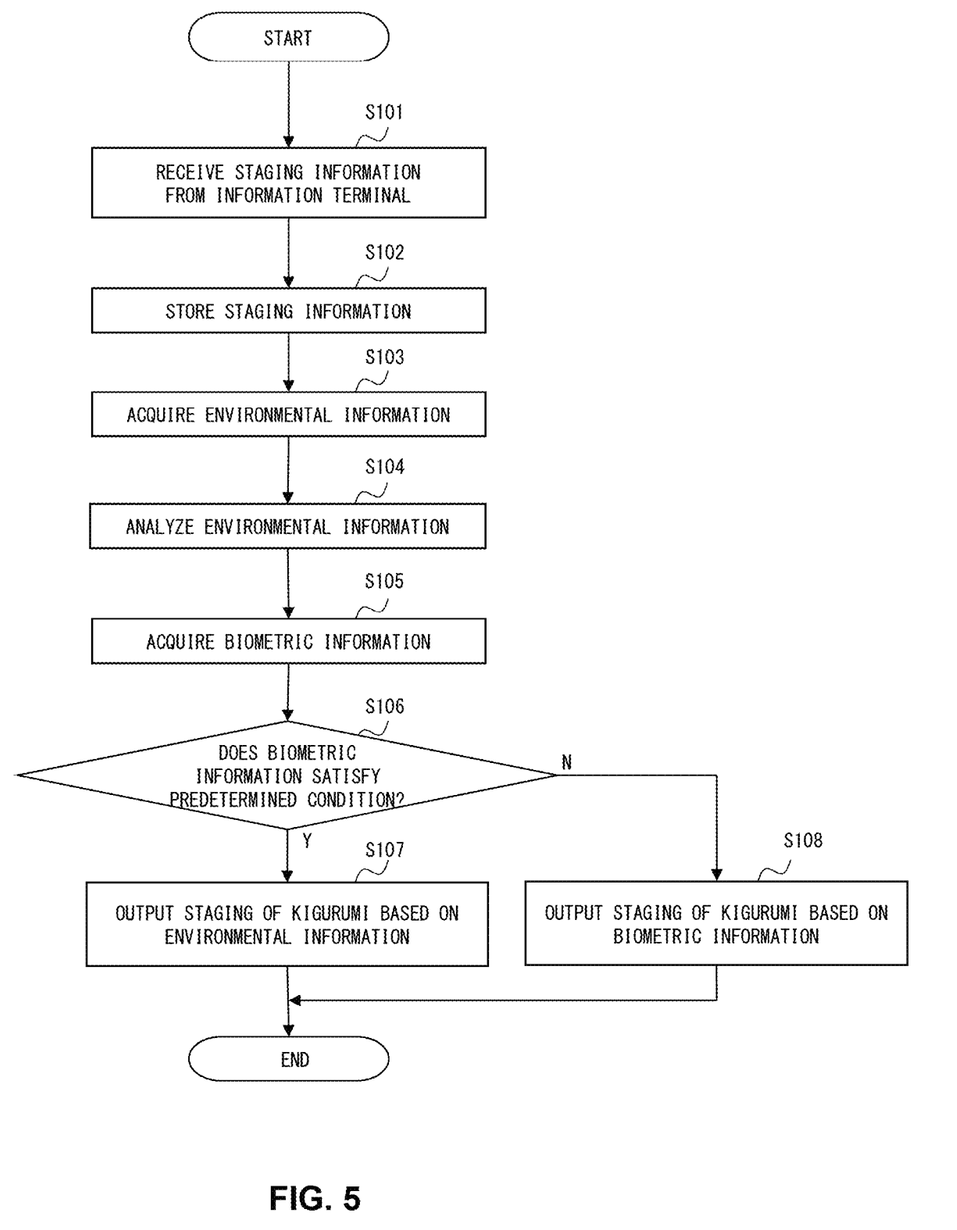
FIG. 5 is a flow chart showing an example of processing in the staging support apparatus 100.

FIG. 5 is a flow chart showing an example of processing in the staging support apparatus 100. An example of processing in the staging support apparatus 100 will be described with reference to FIG. 5. It should be noted that the staging support apparatus 100 may perform staging of the kigurumi based on biometric information as shown in FIG. 5 or perform staging of the kigurumi in accordance with environmental information without making a determination based on biometric information.

In step S101, the communication interface 102 receives staging information from the information terminal 200.

In step S102, the memory 103 stores the staging information received by the communication interface 102.

In step S103, the environmental information acquiring module 107 acquires a sound picked up by the microphone 105 or an image photographed by the camera 106 as environmental information. For example, the environmental information may be an image or a sound within a range of spread arms or legs of the kigurumi. The range in which the environmental information is to be acquired can be configured by the director or the like.

In step S104, the staging output device 112 analyzes an age and/or a gender of the spectator based on environmental information. In addition, the staging output device 112 may analyze a facial expression or a movement of the spectator. The staging output device 112 can analyze an age, gender, a facial expression, or a movement of the spectator by adopting known techniques such as image recognition and voice recognition.

In step S105, the biometric information acquiring device 108 acquires biometric information on the performer P.

In step S106, the staging output device 112 determines whether or not the biometric information satisfies a predetermined condition. For example, the predetermined condition is whether or not the acquired biometric information is within a predetermined range from a normal heart rate or a normal pulse of the performer P during exercise. The predetermined condition can be configured by the director or the like. Accordingly, the director or the like can perform staging with due considerations to the state of health of the performer P. In step S106, when the staging output device 112 determines that the biometric information satisfies the predetermined condition, processing is advanced to step S107. Otherwise, the processing is advanced to step S108.

In step S107, the staging output device 112 outputs, based on staging information 104 stored by the memory 103, staging of the kigurumi in accordance with the acquired environmental information. For example, when a child is present near the kigurumi, staging of the kigurumi intended for a child configured in advance by staging information is performed. The staging information associates environmental information and staging of the kigurumi with each other and is configured so as to change a motion of the kigurumi or a sound to be output in accordance with a shout, a hand gesture, or the like by the spectator.

In step S108, the staging output device 112 outputs staging of the kigurumi based on the biometric information acquired in step S105, For example, when the performer P is dehydrated or has a strong sense of fatigue, light may be emitted from the external appearance of the kigurumi or a call may be output so as to notify a person outside of the kigurumi of a state of health of the performer P. What kind of staging is to be output can be configured in advance by the director or the like.

Processing by the staging support apparatus 100 is completed as described above. The staging output device 112 may be configured to make a determination based on biometric information and output staging on a regular basis until staging of the kigurumi based on staging information is completed.

Description of Advantageous Effect

As described above, the staging support apparatus according to the present embodiment outputs staging of the kigurumi in accordance with a surrounding situation of the kigurumi. A structure of kigurumi that covers an entire body of a performer makes it difficult to hear surrounding sounds and also limits the performer's field of view. Therefore, it is difficult for the performer to comprehend his/her surrounding situation and it is a challenge for the performer to act in response to a reaction of a spectator or to act by coordinating timings with other kigurumi. In consideration thereof, the staging support apparatus according to the present embodiment analyzes a surrounding situation of the kigurumi and outputs staging of the kigurumi in accordance with the situation. Accordingly, a burden with respect to staging of the kigurumi to be performed by the performer of the kigurumi can be reduced and seemingly-improvised staging can be performed.

In addition, the staging support apparatus according co the present embodiment performs staging based on the biometric information of the performer of the kigurumi. Accordingly, staging of the kigurumi in consideration of the state of health of the performer P can be performed.

Modification of Embodiment

When performing staging using a plurality of kigurumi, staging information may be configured so as to synchronize timings of staging of the plurality of kigurumi or offset the staging of the plurality of kigurumi by a fixed timing in accordance with distances of separation from other kigurumi. Accordingly, the spectator can be instilled with a sense of togetherness with the plurality of kigurumi as a whole in addition to individual kigurumi and an entertainment property can be heightened.

The embodiment described above can be implemented in various other forms, and various omissions, replacements, and modifications can be made without departing from the gist of the invention. It is to be understood that such embodiments and modifications thereof are included in the scope and gist of the disclosure and are also included in the disclosure as set forth in the claims and the equivalents thereof.

In addition, as a program (software means) that can be executed by a computer, the method described in the embodiment presented above can be scored in a storage medium such as magnetic disk (a flexible disk, a hard disk, or the like), an optical disc (a CD-ROM, a DVD, an MO, or the like), or a semiconductor memory (a ROM, a RAM, a flash memory, or the like) and can be distributed by being transmitted from a communication medium. The program stored in the medium includes a configuration program that constructs, inside a computer, software means (also including tables and data structures in addition to an executable program) to be executed by the computer. The computer that realizes the present server reads the program stored in the storage medium and, in some cases, constructs the software means using the configuration program, and executes the processing described earlier by having the software means control operations. It should be noted that the term "storage medium" as used in the present specification is not limited to those intended to be distributed and also includes storage media such as a magnetic disk and a semiconductor memory provided inside the computer or in a device being connected via a network.

Figure 6:
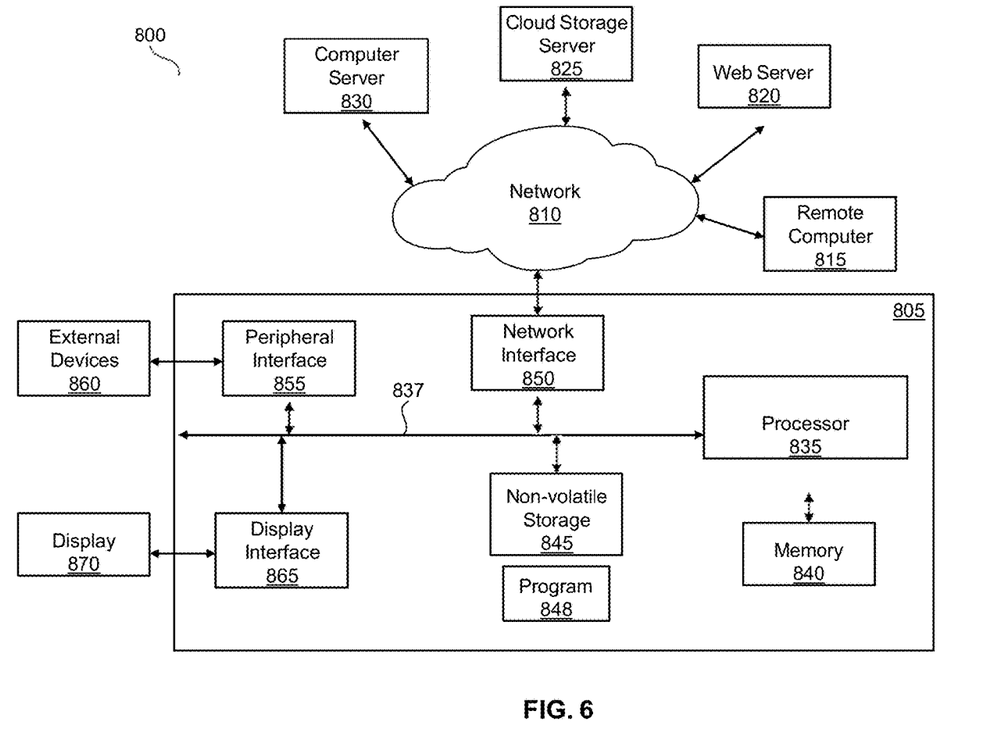
FIG. 6 illustrates a block diagram of a computer that may implement the various embodiments described herein.

FIG. 6 illustrates a block diagram of a computer that may implement the various embodiments described herein. Specifically, this configuration is one example of the information terminal 200 or staging support apparatus shown depicted in FIGS. 3 and 4.

The present disclosure may be embodied as a system, a method, and/or a computer program product. The computer program product may include a computer readable storage medium on which computer readable program instructions are recorded that may cause one or more processors to carry out aspects of the embodiment.

The computer readable storage medium may be a tangible device that can store instructions for use by an instruction execution device (processor). The computer readable storage medium may be, for example, but is not limited to, an electronic storage device, a magnetic storage device, an optical storage device, an electromagnetic storage device, a semiconductor storage device, or any appropriate combination of these devices. A non-exhaustive list of more specific examples of the computer readable storage medium includes each of the following (and appropriate combinations): flexible disk, hard disk, solid-state drive (SSD), random access memory (RAM), read-only memory (ROM), erasable programmable read-only memory (EPROM or Flash), static random access memory (SRAM), compact disc (CD or CD-ROM), digital versatile disk (DVD) and memory card or stick. A computer readable storage medium, as used in this disclosure, is not to be construed as being transitory signals per se, such as radio waves or other freely propagating electromagnetic waves, electromagnetic waves propagating through a waveguide or other transmission media (e.g., light pulses passing through a fiber-optic cable), Cr electrical signals transmitted through a wire.

Computer readable program instructions described in this disclosure can be downloaded to an appropriate computing or processing device from a computer readable storage medium or to an external computer or external storage device via a Global network (i.e., the Internet), a local area network, a wide area network and/or a wireless network. The network may include copper transmission wires, optical communication fibers, wireless transmission, routers, firewalls, switches, gateway computers and/or edge servers. A network adapter card or network interface in each computing or processing device may receive computer readable program instructions from the network and forward the computer readable program instructions for storage in a computer readable storage medium within the computing or processing device.

Computer readable program instructions for carrying out operations of the present disclosure may include machine language instructions and/or microcode, which may be compiled or interpreted from source code written in any combination of one or more programming languages, including assembly language, Basic, Fortran, Java, Python, R, C, C++, C# or similar programming languages. The computer readable program instructions may execute entirely on a user's personal computer, notebook computer, tablet, or smartphone, entirely on a remote computer or computer server, or any combination of these computing devices. The remote computer or computer server may be connected to the user's device or devices through a computer network, including a local area network or a wide area network, or a global network (i.e., the Internet). In some embodiments, electronic circuitry including, for example, programmable logic circuitry, field-programmable gate arrays (FPGA), or programmable logic arrays (PLA) may execute the computer readable program instructions by using information from the computer readable program instructions to configure or customize the electronic circuitry, in order to perform aspects of the present disclosure.

Aspects of the present disclosure are described herein with reference to flow diagrams and block diagrams of methods, apparatus (systems), and computer program products according to embodiments of the disclosure. It will be understood by those skilled in the art that each block of the flow diagrams and block diagrams, and combinations of blocks in the flow diagrams and block diagrams, can be implemented by computer readable program instructions.

The computer readable program instructions that may implement the systems and methods described in this disclosure may be provided to one or more processors (and/or one or more cores within a processor) of a general purpose computer, special purpose computer, or other programmable apparatus to produce a machine, such that the instructions, which execute via the processor of the computer or other programmable apparatus, create a system for implementing the functions specified in the flow diagrams and block diagrams in the present disclosure. These computer readable program instructions may also be stored in a computer readable storage medium that can direct a computer, a programmable apparatus, and/or other devices to function in a particular manner, such that the computer readable storage medium having stored instructions is an article of manufacture including instructions which implement aspects of the functions specified in the flow diagrams and block diagrams in the present disclosure.

The computer readable program instructions may also be loaded onto a computer, other programmable apparatus, or other device to cause a series of operational steps to be performed on the computer, other programmable apparatus or other device to produce a computer implemented process, such that the instructions which execute on the computer, other programmable apparatus, or other device implement the functions specified in the flow diagrams and block diagrams in the present disclosure.

FIG. 6 is a functional block diagram illustrating a networked system 800 of one or more networked computers and servers. In an embodiment, the hardware and software environment illustrated in FIG. 6 may provide an exemplary platform for implementation of the software and/or methods according to the present disclosure.

Referring to FIG. 6, a networked system 800 may include, but is not limited to, computer 805, network 810, remote computer 815, web server 820, cloud storage server 825 and computer server 830. In some embodiments, multiple instances of one or more of the functional blocks illustrated in FIG. 6 may be employed.

Additional detail of computer 805 is shown in FIG. 6. The functional blocks illustrated within computer 805 are provided only to establish exemplary functionality and are not intended to be exhaustive. And while details are not provided for remote computer 815, web server 820, cloud storage server 825 and computer server 830, these other computers and devices may include similar functionality to that shown for computer 805.

Computer 805 may be a personal computer (PC), a desktop computer, laptop computer, tablet computer, netbook computer, a personal digital assistant (PDA), a smart phone, or any other programmable electronic device capable of communicating with other devices on network 810.

Computer 805 may include processor 835, bus 837, memory 840, non-volatile storage 845, network interface 850, peripheral interface 855 and display interface 865. Each of these functions may be implemented, in some embodiments, as individual electronic subsystems (integrated circuit chip or combination of chips and associated devices), or, in other embodiments, some combination of functions may be implemented on a single chip (sometimes called a system on chip or SoC).

Processor 835 may be one or more single or multi-chip microprocessors, such as those designed and/or manufactured by Intel Corporation, Advanced Micro Devices, Inc. (AMD), Arm Holdings (Arm), Apple Computer, etc. Examples of microprocessors include Celeron, Pentium, Core i3, Core i5 and Core i7 from. Intel Corporation; Opteron, Phenom, Athlon, Turbo and Ryzen from AMD; and Cortex-A, Cortex-R and Cortex-M from Arm.

Bus 837 may be a proprietary or industry standard high-speed parallel or serial peripheral interconnect bus, such as ISA, PCI, PCI Express (PCI-e), AGP, and the like.

Memory 840 and non-volatile storage 845 may be computer-readable storage media. Memory 840 may include any suitable volatile storage devices such as Dynamic Random Access Memory (DRAM) and Static Random Access Memory (SRAM). Non-volatile storage 845 may include one or more of the following: flexible disk, hard disk, solid-state drive (SSD), read-only memory (ROM), erasable programmable read-only memory (EPROM or Flash), compact disc (CD or CD-ROM), digital versatile disk (DVD) and memory card or stick.

Program 848 may be a collection of machine readable instructions and/or data that is stored in non-volatile storage 845 and is used to create, manage and control certain software functions that are discussed in detail elsewhere in the present disclosure and illustrated in the drawings. In some embodiments, memory 840 may be considerably faster than non-volatile storage 845. In such embodiments, program 848 may be transferred from non-volatile storage 845 to memory 840 prior to execution by processor 835.

Computer 805 may be capable of communicating and interacting with other computers via network 810 through network interface 850. Network 810 may be, for example, a local area network (LAN), a wide area network (WAN) such as the Internet, or a combination of the two, and may include wired, wireless, or fiber optic connections. In general, network 810 can be any combination of connections and protocols that support communications between two or more computers and related devices.

Peripheral interface 855 may allow for input and output of data with other devices that may be connected locally with computer 805. For example, peripheral interface 855 may provide a connection to external devices 860. External devices 860 may include devices such as a keyboard, a mouse, a keypad, a touch screen, and/or other suitable input devices. External devices 860 may also include portable computer-readable storage media such as, for example, thumb drives, portable optical or magnetic disks, and memory card. Software and data used to practice embodiments of the present disclosure, for example, program 848, may be stored on such portable computer-readable storage media. In such embodiments, software may be loaded onto non-volatile storage 845 or, alternatively, directly into memory 840 via peripheral interface 855. Peripheral interface 855 may use an industry standard connection, such as RS-232 or Universal Serial Bus (USB), to connect with external devices 860.

Display interface 865 may connect computer 805 to display 870. Display 870 may be used, in some embodiments, to present a command line or graphical user interface to a user of computer 805. Display interface 865 may connect to display 870 using one or more proprietary or industry standard connections, such as VGA, DVI, Display-Port and HDMI.

As described above, network interface 850, provides for communications with other computing and storage systems or devices external to computer 805. Software programs and data discussed herein may be downloaded from, for example, remote computer 815, web server 820, cloud storage server 825 and computer server 830 to non-volatile storage 845 through network interface 850 and network 810. Furthermore, the systems and methods described in this disclosure may be executed by one or more computers connected to computer 805 through network interface 850 and network 810. For example, in some embodiments the systems and methods described in this disclosure may be executed by remote computer 815, computer server 830, or a combination of the interconnected computers on network 810.

Data, datasets and/or databases employed in embodiments of the systems and methods described in this disclosure may be stored and or downloaded from remote computer 815, web server 820, cloud storage server 825 and computer server 830.

Obviously, numerous modifications and variations of the present disclosure are possible in light of the above teachings. It is therefore to be understood that within the scope of the appended claims, the disclosure may be practiced otherwise than as specifically described herein.

The invention claimed is:

1. A kigurumi staging support apparatus to be worn by a performer of kigurumi, the kigurumi staging support apparatus comprising:
    a biometric sensor configured to acquire biometric information of the performer of the kigurumi;
    a memory configured to store staging information of the kigurumi; and
    processing circuitry configured to:
        acquire the biometric information of the performer of the kigurumi,
        determine whether the biometric information satisfies a predetermined condition based on whether the biometric information is within a predetermined numerical range of the performer during exercise,
        in response to a determination that the biometric information satisfies the predetermined condition, output a first staging of the kigurumi by changing an external appearance of the kigurumi or outputting a move of the kigurumi, wherein the first staging indicates a state of a health of the performer, and
        in response to a determination that the biometric information does not satisfy the predetermined condition, output a second staging of the kigurumi in accordance with an analyzed situation of a spectator watching the performer of the kigurumi, wherein the analyzed situation of the spectator is derived from environmental information capturing surroundings of the kigurumi,
    wherein the output of the first staging in response to the biometric information satisfying the predetermined condition is different than the output of the second staging in response to the biometric information not satisfying the predetermined condition.

2. The kigurumi staging support apparatus of claim 1, further comprising:
    an interface configured to acquire the environmental information capturing the surroundings of the kigurumi.

3. The kigurumi staging support apparatus according to claim 2, further comprising:
    a microphone configured to capture sound of the surroundings of the kigurumi; and
    a camera configured to capture images of the surroundings of the kigurumi.

4. The kigurumi staging support apparatus of claim 3, wherein
    the interface is further configured to acquire a sound captured by the microphone as the environmental information.

5. The kigurumi staging support apparatus of claim 3, wherein
    the interface is further configured to acquire an image photographed by the camera as the environmental information.

6. The kigurumi staging support apparatus of claim 2, wherein
    the processing circuitry is further configured to determine an age and/or a gender of the spectator based on the environmental information.

7. The kigurumi staging support apparatus of claim 1, wherein
    the processing circuitry is further configured to perform at least one of staging by changing the external appearance of the kigurumi, moving at least a part of the kigurumi, and outputting a sound from the kigurumi.

8. The kigurumi staging support apparatus of claim 1, wherein
    the biometric sensor is a wearable device configured to be worn by the performer of the kigurumi.

9. The kigurumi staging support apparatus of claim 1, further comprising:
    a costume configured to cover at least a head of the performer.

10. The kigurumi staging support apparatus of claim 1, further comprising:
    a communication interface configured to receive the staging information.

11. A kigurumi staging support system that is a staging support system with respect to kigurumi, the kigurumi staging support system comprising:

an information terminal that transmits staging information of the kigurumi; and a kigurumi staging support apparatus to be worn by a performer of the kigurumi, wherein the kigurumi staging support apparatus includes:

a biometric sensor configured to acquire biometric information of the performer of the kigurumi;

a memory configured to store staging information of the kigurumi; and processing circuitry configured to:

acquire the biometric information of the performer of the kigurumi, determine whether the biometric information satisfies a predetermined condition based on whether the biometric information is within a predetermined numerical range of the performer during exercise, in response to a determination that the biometric information satisfies the predetermined condition, output a first staging of the kigurumi by changing an external appearance of the kigurumi or outputting a move of the kigurumi, wherein the first staging indicates a state of a health of the performer, and in response to a determination that the biometric information does not satisfy the predetermined condition, output a second staging of the kigurumi in accordance with an analyzed situation of a spectator watching the performer of the kigurumi, wherein the analyzed situation of the spectator is derived from environmental information capturing surroundings of the kigurumi, wherein the output of the first staging in response to the biometric information satisfying the predetermined condition is different than the output of the second staging in response to the biometric information not satisfying the predetermined condition.

12. The kigurumi staging support system of claim 11, wherein the kigurumi staging support apparatus includes a communication interface configured to receive the staging information from the information terminal.

13. The kigurumi staging support system of claim 12, wherein the kigurumi staging support apparatus comprises:

a microphone configured to capture sound of the surroundings of the kigurumi;

a camera configured to capture images of the surroundings of the kigurumi; and the processing circuitry is further configured to determine an age and/or a gender of the spectator based on the sound captured by the microphone and the images captured by the camera; and output the staging of the kigurumi in accordance with the determined age and/or gender of the spectator.

14. The kigurumi staging support system of claim 13, wherein the processing circuitry is further configured to output the staging information by at least one of changing the external appearance of the kigurumi, moving at least a part of the kigurumi, and outputting a sound from the kigurumi.

15. A kigurumi staging support method that is a staging support method with respect to a performer wearing a kigurumi with a kigurumi staging support apparatus, the method comprising:

storing, by a memory of the kigurumi staging support apparatus, staging information of the kigurumi;

acquiring, by a biometric sensor of the kigurumi staging support apparatus, biometric information of the performer of the kigurumi;

determining, by a processing circuitry of the kigurumi staging support apparatus, whether the biometric information satisfies a predetermined condition based on whether the biometric information is within a predetermined numerical range of the performer during exercise;

outputting, by the processing circuitry, a first staging of the kigurumi and a second staging of the kigurumi in accordance with cases of the biometric information satisfying the predetermined condition and of the biometric information not satisfying the predetermined condition;

in response to a determination that the biometric information satisfies the predetermined condition, outputting the first staging of the kigurumi by (a) changing an external appearance of the kigurumi or (b) outputting a move of the kigurumi, wherein the first staging indicates a state of a health of the performer; and in response to a determination that the biometric information does not satisfy the predetermined condition, outputting the second staging of the kigurumi in accordance with an analyzed situation of a spectator watching the performer of the kigurumi, wherein the analyzed situation of the spectator is derived from environmental information capturing surroundings of the kigurumi, wherein the output of the first staging in response to the biometric information satisfying the predetermined condition is different than the output of the second staging in response to the biometric information not satisfying the predetermined condition.

16. The method of claim 15, wherein the method further comprises:

causing, by the processing circuitry, the kigurumi staging support apparatus to output a staging characteristic including at least one of changing an external appearance of the kigurumi, moving at least a part of the kigurumi, and outputting a sound from the kigurumi.

* * * * *